United States Patent Office 3,398,367
Patented Aug. 20, 1968

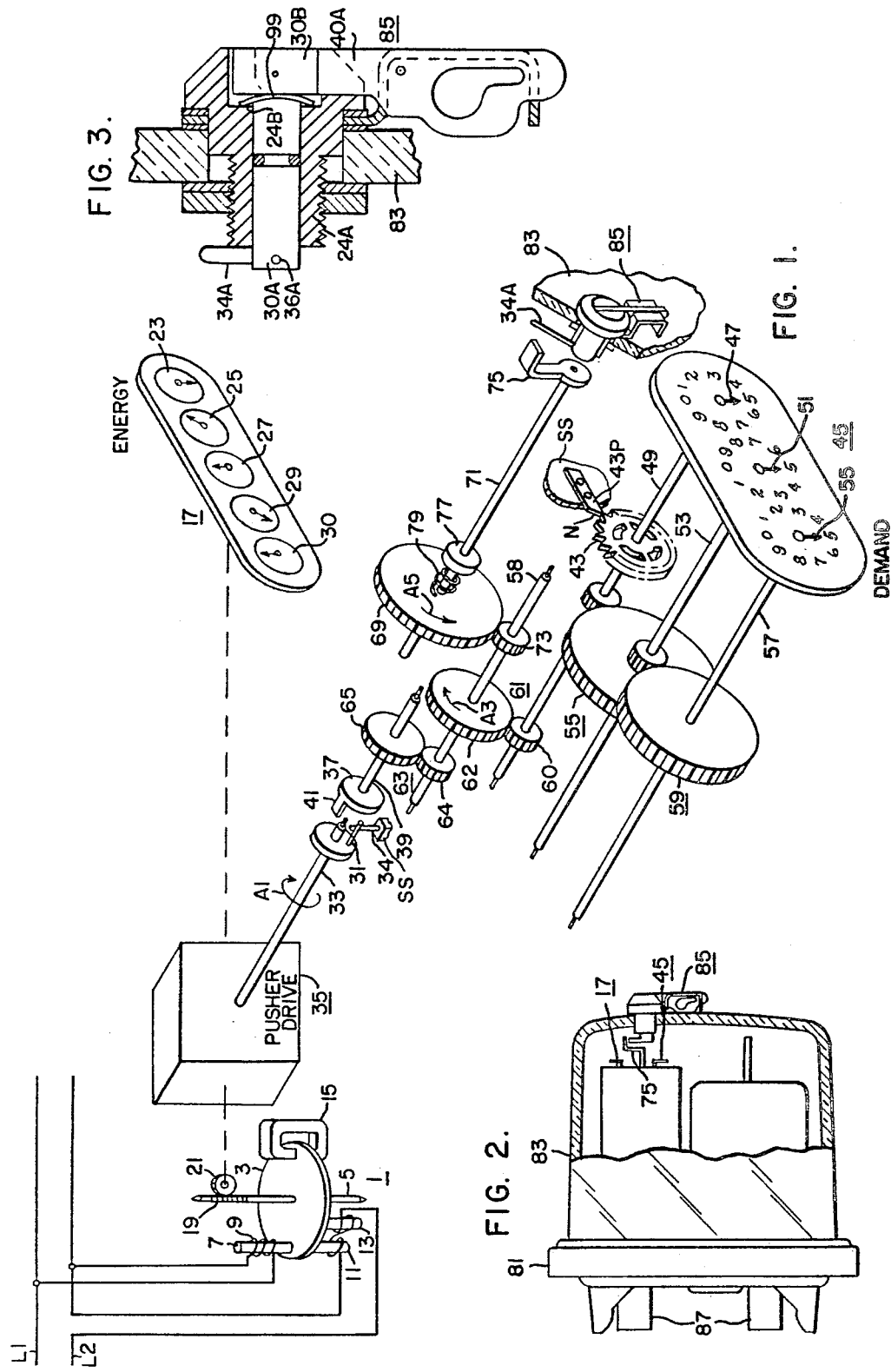

3,398,367
REGISTER DEVICE WHEREIN INDICATOR IS RESTRAINED AGAINST UNDESIRABLE MOVEMENT
Eugene C. Benbow, Raleigh, N.C., assignor to Westinghouse Electric Corporation, East Pittsburgh, Pa., a corporation of Pennsylvania
Filed Dec. 31, 1964, Ser. No. 422,852
3 Claims. (Cl. 324—103)

ABSTRACT OF THE DISCLOSURE

A register shaft carries a magnetic toothed wheel which rotates adjacent a permanent magnet. The magnet field restrains the wheel in any position to which it is rotated.

---

This invention relates to register devices having a shaft to be held against undesired movement, and it has particular relation to devices for measuring the maximum demand of a variable quantity.

Although the invention may be incorporated in a device for measuring various variable quantities it is particularly suitable for measuring the maximum demand of electric energy. For this reason in the following discussion it will be assumed that the invention is incorporated in a device for measuring the maximum demand of electric energy, and particularly in a device of the general type shown in the Benbow et al. patent application, Ser. No. 401,559, filed Oct. 5, 1964, which is assigned to the same assignee.

In the device of the aforesaid patent application, a low-speed first shaft is rotated through a maximum angle of the order of 300° by means of a maximum-demand pusher drive. This first shaft is geared to rotate a high-speed second shaft through gearing having a ratio such as 100 to 1. That is, one-half revolution of the first shaft may rotate the second shaft fifty revolutions.

If no restraint is provided, the shafts are free to move at times under the influence of extraneous forces such as those resulting from mechanical vibration. To restrain the shafts against such movement, the aforesaid Benbow et al. application provides a leaf spring which has an end biased against the first shaft.

The frictional restraint introduced by the spring acts as a load on the pusher drive. Although such a construction is feasible it has been found to be difficult to strike a satifactory and permanent balance between a restraint loading sufficient to prevent undesired movement and insufficient to affect seriously the operation of the measuring device (usually a watt-hour meter) employed for actuating the pusher drive.

In accordance with the invention a fluid restraint is employed which preferably acts on the second shaft. In a preferred embodiment of the invention magnetic forces are developed to restrain the shaft in any one of a plurality of angular positions.

It is therefore an object of the invention to provide an improved register device which is restrained against undesirable movement.

It is also an object of the invention to provide an improved register device having magnetic restraint against undesired movement.

Other objects of the invention will be apparent from the following description taken in conjunction with the accompanying drawings, in which:

FIGURE 1 is a schematic view with parts in perspective showing a measuring device embodying the invention;

FIG. 2 is a view in side elevation with parts broken away of the measuring device of FIG. 1; and FIG. 3 is a view in sectional elevation of the reset mechanism employed in the device of FIG. 1.

In FIG. 1 it is assumed that the variable quantity to be measured is the electric energy supplied to a load over a circuit represented by conductors L1 and L2. Although a polyphase circuit may be employed, it will be assumed for present purposes that the circuit is a single-phase alternating current circuit operating at a power frequency such as 60 cycles per second.

The total electric energy supplied to the load is measured by a watt-hour meter 1 of conventional construction. For illustrative purposes the watt-hour meter includes an electroconductive armature disc 3 which is mounted on a shaft 5 for rotation aobut the axis of the shaft. A shifting magnetic field is created in a conventional manner to apply a torque to the disc 3. To this end a voltage pole 7 having a voltage coil 9 is connected for energization in accordance with the voltage across the conductors L1 and L2. Current poles 11 and 13 are provided with current windings which are connected for energization in accordance with current flowing in the conductor L2. A damping magnet 15 of the permanent-magnet type has an air gap within which a portion of the disc 3 is located in order to damp rotation of the disc in a manner well understood in the art.

The rotations of the disc 3 are counted by an energy register 17 which is coupled to a worm 19 provided on the shaft 5 through a worm wheel 21. It will be assumed that the register 17 includes a first-order decimal digit or decade counter 23, a second-order decade counter 25, a third-order decade counter 27, a fourth-order decade counter 29, and a fifth-order decade counter 30. Such counters are well understood in the art, and may be calibrated to read directly the total energy consumption in watt-hour of a load supplied through the conductors L1 and L2.

The meter 1 also rotates an operating member or pusher 31 and a shaft 33 about the axis of the shaft through a pusher drive 35. At the beginning of each demand interval the shaft 33 occupies a predetermined starting or zero position wherein the pusher 31 abuts a zero stop pin 34 which is fixed to the stationary supporting structure SS and rotates in a clockwise direction in the direction of the arrow A1 as viewed in FIG. 1 away from such position in accordance with the energy consumption during the demand interval. For present purposes it will be assumed that the demand interval has a duration of 30 minutes. At the end of each demand interval the shaft 33 and the pusher 31 are reset to their zero position in preparation for operation during a succeeding interval. Mechanism operating in this manner is well known in the art. For example, the shaft 33 may operate in the same manner as the sleeve 22 of the Lewis et al. Patent 2,259,314, issued Oct. 14, 1941.

In order to determine the maximum rotation of the pusher 31 from its zero position over a billing period, a disc 37 is secured to a shaft 39 which is aligned with the shaft 33 but which is mounted for independent rotation about its axis. The disc 37 has a lug or pushed member 41 which projects into the path of rotation of the pusher 31. During its rotation the pusher 31 may engage the lug 41 to rotate the shaft 39 about its axis. During any demand interval if the pusher 31 is rotated through an angle greater than that occurring during any preceding demand interval of the billing period, the pusher again engages the lug 41 for the purpose of advancing the lug 41 to a new position.

For indicating the position of the lug 41 the shaft 39 is permanently coupled to an indicating device in the form of a demand register 45. The specific demand register illustrated includes a first-order decimal digit or decade counter represented by a pointer 47 which is secured to a shaft 49 for rotation about the axis of the shaft. A second-order decade counter is represented by a pointer 51 which is secured to a shaft 53 for rotation about the axis of the shaft. A third-order decade counter is represented by a pointer 55 which is secured to a shaft 57 for rotation about the axis of the shaft. Gearing 55 rotates the shaft 53 once for each ten rotations of the shaft 49. Gearing 59 rotates the shaft 57 once for each ten rotations of the shaft 53. Each pointer has associated therewith ten numerals 0–9 for indicating angular position of the pointer.

The register 45 is permanently coupled to the shaft 39 through gearing 61 and gearing 63. The gear ratios may be so selected that the register 45 can be calibrated to read directly the maximum demand in watts occurring during any demand interval in a billing period.

The gearing 61 includes a pinion 60 mounted on the shaft 49 and a gear 62 secured to a shaft 58 for rotation about the axis of the shaft. The gearing 63 includes a pinion 64 secured to the shaft 58 and a gear 65 secured to the shaft 39.

Resetting of the demand register 45 to a predetermined or zero position is effected at the end of a billing period by rotation of the shaft 58 in a resetting direction (clockwise in the direction of the arrow A3 in FIG. 1). To this end a resetting member in the form of a gear 69 is mounted on a shaft 71 for rotation about the axis of the shaft. The gear 69 is coupled to a pinion 73 secured to the shaft 58. Rotation of a reset arm 75 about the axis of the shaft 71 is employed for rotating the gear 69 about its axis. The resetting of the demand register 45 from its position of greatest advance is effected by rotation of the shaft 71 through an angle which does not exceed 360° in a counter-clockwise direction in the direction of the arrow A5 in FIG. 1.

Although the gear 69 may be secured directly to the shaft 71 such a construction may result in damage to components of the gear train such as the pinions and gears. This is for the reason that the gearing is selected to effect many revolutions of the shaft 49 (in the case illustrated as many as 100 revolutions) for one revolution or less of the shaft 71. For such a gear relation a slight amount of friction offered to rotation by the shaft 49 is amplified to present a large torque opposing rotation of the shaft 71. Thus the torque applied to the shaft 71 for the purpose of overcoming the aforesaid friction may be sufficient to damage components of the gear train.

In order to prevent damage to components of the gear train, a yieldable or resilient coupling is introduced between the point of application of a resetting force and the demand register. In the specific embodiment of FIG. 1 the gear 69 is mounted for rotation relative to the shaft 71. The shaft has secured thereto a collar 77. A helical spring 79 surrounds the shaft 71, has one end secured to the gear 69 and has its remaining end secured to the collar 77. Thus the spring 79 represents a resilient coupling between the gear 69 and the reset arm 75 which permits relative movement of these parts through a suitable angle such as 15°.

In practice the components thus far described would be enclosed in a casing such as I have shown in FIG. 2. This casing may include a base member 81 on which the meter 1 is mounted. The registers 17 and 45 are also shown in FIG. 2 as supported through the meter 1 by the base member 81. A cup-shaped glass cover 83 has its open end closed by the base member 81 to complete an enclosure for the meter and registers. The registers may be read through the transparent glass cover.

It will be noted that the reset arm 75 is positioned adjacent the front wall of the member 83. This wall carries a reset unit 85 which may be operated at the end of the billing period by a meter reader for the purpose of resetting the demand register 45 through operation of the arm 75. Contact blades 87 project from the base member 81 for the purpose of establishing electrical connections between the meter 1 and an external circuit.

Although the reset unit 85 may be of conventional construction a suitable unit is illustrated in FIG. 3. For illustrative purposes it will be assumed that the reset unit is generally similar to that shown in the Benbow et al. Patent 3,059,181, issued Oct. 16, 1962. Parts of the reset unit in FIG. 3 are labeled by the same reference characters employed in the Benbow et al. patent to identify the corresponding parts, except that in FIG. 3 the suffix A is added to each of such reference characters. For convenience the following list of parts of FIG. 3 is presented:

24A—Bushing
30A—Shaft
34A—Finger
36A—Stop pin
40A—Arm

It will be noted that a spring washer 99 is interposed between a shoulder 24B in the bore of the bushing 24A and the enlarged head 30B on the shaft 30A. This spring biases the shaft 30A to the right as viewed in FIG. 3 to develop a substantial friction between the finger 34A of the shaft assembly and the bushing. This friction opposes movement of the shaft relative to the bushing with a torque which is slightly greater than that required to wind up the spring 79. Thus at the end of a resetting operation the friction prevents "zero bounce" of the register 45 by the wound spring 79 should the arm 40A suddenly be released. The spring 79 assures a resetting operation of the register 45, without unduly stressing any component of the structure.

A typical operation of the equipment shown in the drawing now will be considered. It will be assumed that a billing period has just been completed and that the demand register 45 has been reset to its zero condition. It will be assumed that the resetting operation has brought the lug 41 into engagement with the pusher 31. If electric energy is being supplied to a load during the succeeding demand interval of 30 minutes the watt-hour meter 1 operates to advance the energy register 17 in accordance with the energy supplied to the load, and the watt-hour meter also advances the pusher 31 about the axis of the shaft 33 in the direction of the arrow A1 at a rate dependent on the rate at which energy is being supplied to the load. During such movement the pusher 31 carries with it the lug 41 and this operates through its gear train to advance the pointers of the demand register 45 in accordance with the energy being supplied to the load.

At the expiration of the first demand interval following the resetting operation of the demand register the pusher 31 is reset to its zero condition in a manner which will be clear from the aforesaid Lewis et al. patent. However, the shaft 39 is maintained in its advanced position.

During the next demand interval the consumption of energy by the load may be insufficient to bring the pusher 31 into engagement with the lug 41. In such case the condition of the demand register 45 remains unchanged. However if the load requirements increase sufficiently during a succeeding demand interval, the pusher 31 again engages the lug 41 and advances it still further. Such advance is accompanied by an increase in the reading of the demand register 45. In this way the demand register 45 at any instant of reading shows the maximum demand occurring for any demand interval of the current billing period up to the instant of reading.

At the end of the billing period which may be of one month duration, the meter reader notes the reading of the demand register 45 and of the energy register 17. He then manipulates the arm 40A counterclockwise to bring the finger 34A into engagement with the arm 75. Rotation of the arm 40A is accompanied by a winding operation of the helical spring 79. The helical spring in turn applies torque to the gear wheel 69 for the purpose of resetting the demand register 45 and the lug 41 until the lug again engages the pusher 31.

The stop pin 36A stops the resetting motion of the arm 40A when the arm has traveled far enough to assure resetting of the register 45. Should the meter reader suddenly release the arm 40A the friction developed by the spring washer 99 between the bushing 24A and the shaft 30A prevents rebound of the register by the spring 79 away from the reset position of the register. The meter reader then manipulates the arm 40A to rotate the shaft 30A in a clockwise direction until the arm reaches its sealing position. In such position the finger 34A is located beyond the maximum advance of the arm 75.

The shafts 39, 49, 53, 57, 58 and 71 together with their gearing constitute an assembly wherein the various parts tend to float in any positions which they are given. Under such circumstances they are subject to movement in response to extraneous forces such as those due to vibration and in response to kinetic energy produced by intentional movement of the parts. In order to restrain undesired movements of the parts the aforesaid Benbow et al. application provides a leaf spring having an end biased against the low-speed shaft 39. The resultant friction between the spring and the shaft restrains the parts against undesired movements but permits intentional movement by the pusher drive and by the resetting mechanism.

As previously pointed out the application of a friction drag is feasible but has certain limitations. When the friction drag is placed on the low-speed shaft 39 back lash and inertia decrease its effectiveness on the higher speed shafts. If the friction drag were placed on the high speed shaft 49, the amplification of the minimum practical friction drag would impose a substantial load on the watt-hour meter.

In accordance with my invention magnetic forces are employed to restrain the shaft 49 in any one of several angular positions. These angular positions preferably include ten uniformly spaced angular positions each corresponding to a position wherein the pointer 47 points to a separate one of its associated ten numerals.

The desired restraint is provided by a first magnetic device mounted on the shaft 49 and a second magnetic device mounted on the supporting structure SS, the devices being spaced from each other just enough to assure mechanical clearance therebetween. The devices are designed to develop a magnetic force therebetween and are so configured that the force is larger when the pointer 47 is pointing directly towards any one of its associated numerals than when the pointer is slightly displaced from a numeral. Thus, if the force is at a maximum for ten uniformly spaced angular positions of the shaft 49 the pointer 47 will tend to take a position pointing directly to one of its associated numerals.

Although the first magnetic device may be of permanent-magnetic material, preferably it is cut in the form of a wheel 43 having teeth around its circumference from a thin sheet of soft magnetic steel or iron. It is desirably constructed to add the minimum inertia to the shaft 49 consistent with structural stability.

The second device, preferably a permanent magnet 43P, is located adjacent to the wheel 43 to provide a fixed magnetic field through which the teeth of the wheel move. For present purposes it will be assumed that the permanent magnet has a pointed north pole N adjacent, but slightly spaced from a small part of the path through which the teeth on the wheel 43 move.

If the wheel 43 starts to rotate due to extraneous forces such as those resulting from vibration, the permanent magnet 43P will "lock in" on a tooth of the wheel to prevent further rotation of the wheel by such forces.

However, forces derived from the pusher drive 35 or from a resetting operation are sufficiently large to rotate the wheel 43.

Inasmuch as the teeth of the wheel 43 do not engage mechanically the permanent magnet 43P, no wear of these parts results, and a stable restraint is assured at a small value of restraint torque which suffices to restrain rotation of the shaft 49 by extraneous forces without unduly loading the watt-hour meter. If desired, the strength of this torque may be adjusted by altering the magnetization of the permanent magnet or by altering the opening between the magnet and the wheel 43.

If the wheel 43 has ten soft-magnetic teeth the teeth may be so positioned relative to the permanent magnet that each tooth provides its maximum restraining force when the pointer 47 is pointing to a separate one of its associated numerals.

If the wheel 43 has twenty teeth, ten of the teeth tend to "stop" the pointer 47 at the ten associated numerals respectively. Each of the remaining ten teeth tends to "stop" the pointer at a position half-way between a separate pair of associated numerals. The wheel having twenty teeth is preferred.

The location of the wheel 43 on the high-speed shaft 49 permits effective restraint with a very small, lightweight wheel and a small permanent magnet. The gear ratios amplify the restraint applied through the wheel 43 to the shafts 39, 53, 57, 58 and 71.

The permanent magnet 43P may be of any suitable material capable of restraining its permanent magnetic properties under the conditions of use. Thus a ceramic or an aluminum-nickel-cobalt-containing permanent magnet, known as Alnico may be employed. In the specific embodiment illustrated the permanent magnet has a side elevation in the form of a parallelogram having a beveled or pointed end forming a north pole. The magnet may be riveted or otherwise secured to a vertical wall of the supporting structure SS.

Although the invention has been described with reference to certain specific embodiments thereof, numerous modifications falling within the spirit and scope of the invention are possible.

I claim as my invention:

1. In a maximum demand device, a structure, a pusher member mounted for rotation about an axis relative to the structure from a starting point in accordance with a variable quantity, said pusher member being reset to the starting point at repetitive times if at such times it is displaced from such point, a pushed member mounted for rotation relative to the structure about said axis and having a part in the path of said pusher, whereby said pusher in one direction of rotation pushes the pushed member to a position corresponding to the maximum excursion of said pusher from said starting point, a first order indicator mounted for rotation relative to the structure about an axis and permanently coupled to the pushed member for rotation at a first higher rate relative to the pushed member, a second order indicator mounted for rotation relative to the structure about an axis and permanently coupled to the first order indicator through a coupling providing rotation of the second order indicator about its axis through an angle of 36° for each rotation of the first order indicator through an angle of 360°; an actuating member mounted for rotation about an axis, a resetting gear mounted for rotation relative to the actuating member about the last-named axis, gear means permanently coupling said resetting gear to the first order indicator for resetting the indicators in response to rotation of the resetting gear about its axis, a spring having one end secured to the resetting gear and a second end secured to the actuating member for resiliently transmitting torques acting about the last-named axis between the actuating member and the resetting gear, said gear means and resetting gear being proportioned to reset the indicators to predetermined positions in response to a rotation of the actuating member about its axis which does not exceed 360°, a wheel mounted for rotation with said first order indicator, said wheel having soft magnetic teeth distributed around the circumference of the wheel, and a permanent magnet mounted on the structure, said magnet having a magnetic field positioned in the path followed by said teeth, whereby said magnet restrains said wheel in any position wherein one of said teeth is adjacent to the magnet.

2. In a maximum demand device, a structure, a pusher member mounted for rotation about an axis relative to the structure from a starting point in accordance with a variable quantity, said pusher member being reset to the starting point at repetitive times if at such times it is displaced from such point, a pushed member mounted for rotation relative to the structure about said axis and having a part in the path of said pusher, whereby said pusher in one direction of rotation pushes the pushed member to a position corresponding to the maximum excursion of said pusher from said starting point, a first shaft mounted for rotation about an axis and permanently coupled to the pushed member for rotation at a higher rate relative to the pushed member, a wheel unit concentric relative to the first shaft, said wheel having soft magnetic teeth distributed around the circumference of the wheel unit, and a permanent magnet unit having a magnetic field positioned to be traversed by the teeth of the wheel unit in response to relative rotation of the units, one of said units being mounted on the first shaft and the other of said units being mounted on the structure, whereby the first shaft is restrained in any of a plurality of angular positions of the wheel.

3. A device as claimed in claim 2 in combination with a measuring device responsive to a function of the volt amperes of an alternating circuit when energized therefrom for repetitively operating the pusher member from a starting position at intervals, a second shaft mounted for rotation about its axis relative to the structure, means coupling said shafts to drive the second shaft from the first shaft at a rate lower than the rate of the first shaft, and indicating means for indicating the angular position of each of the shafts.

References Cited

UNITED STATES PATENTS

| | | | |
|---|---|---|---|
| 2,259,314 | 10/1941 | Lewis et al. | 324—103 |
| 2,416,081 | 2/1947 | Bakke | 188—158 X |
| 2,424,689 | 7/1947 | Hamill | 324—103 |
| 3,208,558 | 9/1965 | Schierbeek | 188—158 |

RUDOLPH V. ROLINEC, *Primary Examiner.*

E. F. KARLSEN, *Assistant Examiner.*